2,873,215

COATED IRON AND METHOD AND COMPOSITIONS FOR PREPARING THE SAME

Fred K. Quigley, Jr., Midland, and Harold A. Walters, Beaverton, Mich., assignors to The Dow Chemical Company, Midland, Mich., a corporation of Delaware No Drawing. Application October 19, 1956
Serial No. 616,943
14 Claims. (Cl. 117—132)

This invention pertains to articles having a surface comprising metallic iron coated with a protective and/or decorative coating, and to a method and compositions for preparing such coated iron surfaces. More particularly, it pertains to the preparation of protective and/or decorative finishes on surfaces of metallic iron, and to the resulting articles, from acidic aqueous latex coating compositions that comprise dispersions of polymers of conjugated diolefins.

It is commonplace to provide metallic iron, steel and other iron-containing metallic surfaces with protective coatings by painting such surfaces with oleoresinous paints. While the so-called "water-base" or "latex" paints wherein the binder is a colloidally dispersed polymer of 1,3-butadiene have found wide applicability and acceptance as protective and/or decorative coating materials for plaster, masonry, concrete and other non-metallic surfaces, these aqueous compositions have not heretofore found favor as coatings for metallic iron. Latex and latex paint coatings in which the binder is an aliphatic conjugated diolefin polymer are adversely criticized for being too soft, as lacking adequate adhesion to the metal base, and for being too easily softened by mineral spirits and by water.

It is an object of this invention to provide protective and/or decorative coatings for iron-containing surfaces.

It is a particular object to provide such coatings from aqueous coating compositions.

Another object is to provide a method for obtaining such coatings from aqueous coating compositions.

Another object is to provide aqueous coating compositions from which to obtain such coatings on iron-containing surfaces.

Another object is to provide articles having iron-containing surfaces coated with films obtained from aqueous latex compositions in which the binder is a polymer of an aliphatic conjugated diolefin.

Still other objects and advantages of the invention will be evident in the following description.

The objects of this invention are attained by applying to the metallic iron-containing surface a thin layer of an acidic aqueous coating composition particularly characterized hereinafter, drying the coating, and advantageously subjecting the dry coating to a heat-treatment step, all as hereinafter more fully described.

The aqueous coating compositions for use in this way are latex compositions in which the aqueous phase is acidic, i. e. has a pH value of at most 5, preferably from 2 to 5 and in which colloidally dispersed particles of a polymer of a conjugated diolefin provide the binder. For reasons that will be evident hereinafter, the acid with which the composition is acidic should be one whose iron salts are soluble in water, such as acetic acid, hydrochloric acid, nitric acid and sulfuric acid.

Such aqueous coatings compositions are readily prepared from the so-called "latexes" of diolefin polymers, i. e. aqueous dispersions of colloidal particles of polymers obtained by polymerization of monomers dispersed as emulsions in aqueous media. Conjugated aliphatic diolefins from which such polymer dispersions are made include, for example, 1,3-butadiene, isoprene, chloroprene, 2,3-dimethyl-1,3-butadiene, and piperylene. Usually, synthetic polymer latexes that are intended for use in latex paints are copolymers of one or more of such conjugated aliphatic diolefins and one or more other polymerizable monoethylenically unsaturated compounds that contain a single vinylidene, i. e. $CH_2=C<$, group in an aliphatic portion of the molecule. Examples of such vinylidene compounds are the alkenylaromatic compounds such as styrene, α-methylstyrene, ar-methylstyrene, α,ar-dimethylstyrene, ar,ar-dimethylstyrene, ethylstyrene, isopropylstyrene, chlorostyrene, dichlorostyrene, methoxystyrene, ethoxystyrene, and vinylnaphthalene, ethylenically unsaturated acid derivatives, e. g. acrylonitrile, methacrylonitrile, methyl acrylate, methyl methacrylate, ethyl acrylate, ethyl methacrylate, butyl methacrylate and hexyl methacrylate, ethylenically unsaturated ethers, e. g. ethyl vinyl ether, ethylenically unsaturated ketones, e. g. vinyl methyl ketone and methyl isopropenyl ketone, ethylenically unsaturated esters, e. g. vinyl acetate, vinyl chloride, vinylidene chloride, and ethylenically unsaturated aliphatic hydrocarbons, e. g. isobutylene. Specific examples of copolymers whose aqueous colloidal dispersions are suitable for making water-base paints are the copolymers of styrene and butadiene; styrene and isoprene; styrene, butadiene and isobutylene; styrene, butadiene and vinyl chloride; styrene, butadiene and methyl isopropenylketone; styrene, butadiene and vinyl acetate; styrene, butadiene and methyl methacrylate; and butadiene and acrylonitrile.

Since the latexes prescribed for the present purposes are intended to provide the binder in the coating composition, which binder must secure the pigment and other solid particles to each other and to the base metal in a tough, adherent film, it is desirable that the aliphatic conjugated diolefin be at least 20, preferably from 30 to 60, percent by weight of the chemically combined monomers in the polymer. Polymers having less than 30 percent by weight of such diolefin are usually too hard and brittle and do not form cohesive films on air-drying the latex. Polymers having more than 60 percent by weight of such a diolefin are usually too tacky and too soft for satisfactory paints.

Methods for making aqueous colloidal polymer dispersions according to the known art usually involve making an aqueous emulsion of the selected monomers in a suitable aqueous medium containing emulsifying agents, protective colloids and catalysts for the polymerization, and subjecting that emulsion to moderate heat until the polymerization is substantially complete.

Since the present purposes require an acidic latex paint, it is preferable to select an aqueous latex polymer dispersion that is itself acidic. Such dispersions can be prepared in known manner by polymerization of a monomeric liquid in an acidic aqueous emulsion. Processes and latex products of this kind are described, for example, in United States Patents 2,460,300, 2,468,027 and 2,444,643. In many instances, aqueous latex polymer dispersions that are neutral to alkaline can be acidified, e. g. by addition thereto of an acid whose iron salts are soluble in water, such as acetic acid or hydrochloric acid, to provide acidic latexes for the present purposes. In some such instances it is necessary to provide additional stabilizers, e. g. non-ionic stabilizers, in the starting latex in order to prevent coagulation upon acidification.

For some purposes, unpigmented latex coatings on iron are desired, but in most instances it is necessary or desirable to incorporate solid pigments and/or fillers and coloring matter as in the preparation of water-base paints.

For this purpose the materials and techniques commonly used in making latex paints can be employed, provided it is borne in mind that the paint here is required to be acidic. Pigments and other agents that are stable in acidic aqueous media are suitable for the present purpose. Suitable solid pigments and extenders are titanium dioxide, lithopone, clays, magnesium silicates, silica, mica, barytes, iron oxides, sienna, umber, ultramarine blue, cadmium pigments, chromic oxide, zinc chromate, carbon black, and phthalocyanine colors. Various acid-stable organic dye colors can be used. In addition, those skilled in the art will want to add further agents such as dispersants, thickeners, defoamers, and bactericides. The coating compositions are usually compounded with the dispersed solids in total amount corresponding to not more than 60, preferably not more than 50, percent by volume of the whole composition. In pigmented compositions, the proportion of pigment solids is usually not more than 60, preferably not more than 45, percent by volume of all the non-volatile solids in the paint. Typical latex coating compositions contain from 15 to 50 percent by volume of total solids, of which total solids from 55 to 100 percent by volume are polymer solids and from 0 to 45 percent by volume are pigment solids. Paints having a low pigment-binder ratio usually form glossy coatings, while paints that have a high ratio of pigment to binder form flat, non-glossy coatings.

It is essential that the latex coating compositions employed for coating iron in accordance with the present invention be acidic. In some instances, a latex paint that is neutral to alkaline can be acidified, e. g. by addition thereto of an acid such as acetic acid or hydrochloric acid. Whatever the sequence of steps and selection of materials, it is necessary for the present purpose that the coating composition, e. g. the water-base paint, be acidic, and preferably that it have a pH value of from 2 or less to 5, as determined by means of a glass-calomel electrode system, when ready for application to the iron-containing surface.

The application of the acidic latex coating composition to the iron-containing surface is carried out in conventional ways, e. g. by brushing, spraying, rolling or dipping, to provide a thin layer of the latex composition on the solid surface. The coating is caused to dry by evaporation of water, leaving a film of the diolefin polymer bound to the solid surface and occluding any non-volatile ingredients, e. g. pigments in the latex paint.

When first so deposited, coatings comprising diolefin polymer binders are not satisfactory coatings on iron for most purposes since the polymer layer is too soft, and lacks sufficient resistance to water, to aqueous solutions, and to organic liquids such as mineral spirits.

When coatings comprising diolefin polymer binders are obtained on metallic iron surfaces from acidic latex compositions in accordance with this invention, the dried coating undergoes a curing or hardening change whereby the film increases in hardness and in resistance to water, to aqueous solutions, and to organic liquids such as mineral spirits. The rate of occurrence of such advantageous curing of the coating film can be accelerated by heating the coating in air in a manner analogous to the baking of enamel finishes. The time of baking required for development of optimum properties is inversely proportional to the temperature attained during the baking step. Typical baking schedules, for example, are from 30 minutes at 250° F. to 15 minutes at 400° F., although longer or shorter baking times and/or higher or lower baking temperatures than those just cited may sometimes be used with advantage.

In the attainment of advantageous improvement in properties of the coating film in accordance with the present invention, there is essential cooperation of the diolefin polymer in the binder, the acid in the water-base coating composition, and the iron in the coated surface. The advantageous curing of the paint film has not been attained when the aqueous coating composition is alkaline in pH, or when the polymer binder does not contain an appreciable proportion of polymerically combined aliphatic conjugated diolefin, or when the coating is applied to a non-iron surface.

These facts support a hypothesis that the advantageous curing of the coating film is due to occurrence of a chemical change involving the ethylenic unsaturation which initially exists in the diolefinic polymer molecules whereby the polymer molecules become three-dimensionally crosslinked, that such curing is catalytically promoted by iron ions in the coating film, and that such iron ions enter the coating layer in consequence of chemical reaction of the acidic ingredients of the acidic latex on the metallic iron surface. However, the invention does not depend upon this or any other hypothesis.

The following examples illustrate the invention but are not to be construed as limiting its scope.

EXAMPLE 1

An aqueous solution consisting of 100 parts by weight of water, 0.25 part by weight of a sodium alkyl sulfate, and 0.75 part by weight of potassium persulfate was acidified to a pH value of 2 by addition thereto of nitric acid. To this solution in a polymerization vessel were charged 60 parts by weight of styrene and 40 parts by weight of 1,3-butadiene. The vessel was closed and the mixture was agitated, heated at 70° C. for 16 hours to obtain substantially complete polymerization of the monomers, and was cooled to room temperature. To the resulting colloidal dispersion of butadiene-styrene copolymer there was added 4 parts by weight of an octylphenyl mono-ether of a polyethylene glycol (molecular weight about 623). The latex dispersion was filtered through a coarse filter to remove a small amount of coagulum, and the pH value of the filtrate was adjusted to 4.5 by addition of ammonium hydroxide.

A portion of this acidic latex dispersion pH value 4.5, was set aside as sample A for evaluation as described below.

Another portion of the filtered latex dispersion just described was made alkaline by addition of ammonium hydroxide to a pH value of 8 and set aside as sample B for evaluation as described below.

An alkaline latex dispersion was also prepared by the following procedure. To an alkaline aqueous solution consisting of 100 parts by weight of water, 0.25 part by weight of a sodium alkyl sulfate, 0.75 part by weight of potassium persulfate, and 0.75 part by weight of sodium bicarbonate, there were added 60 parts by weight of styrene and 40 parts by weight of 1,3-butadiene. The resulting mixture was enclosed in a polymerization vessel and was heated at 70° C. with agitation for 16 hours to obtain substantially complete polymerization of the monomers. After cooling the colloidal dispersion of the butadiene-styrene copolymer to room temperature, there was added 4 parts by weight of an octylphenyl monoether of a polyethylene glycol (molecular weight about 623), and the latex dispersion was filtered through a coarse filter to remove a small amount of coagulum.

A portion of this filtered alkaline latex dispersion, pH value in the range from 7 to 8, was set aside as sample C for evaluation as described below.

Another portion of the filtered alkaline latex dispersion just described was made acidic by addition of acetic acid to a pH value of 4.5 and set aside as sample D for evaluation as described below.

The several samples of latex dispersion described above were evaluated as coatings materials for metallic iron surfaces. Separate panels of bright steel sheet were separately coated with a thin layer of one of the latex samples A through D, respectively. The coatings were air-dried, then baked in an air oven at 275° F. for 30 minutes. The resulting polymer films were tested for hardness, resistance to mineral spirits, and resistance to water. The results of these tests are summarized in the Table I below.

Table I

| Sample | Hardness | Resistance to— | |
|---|---|---|---|
| | | Mineral Spirits | Water |
| A (acidic) | Excellent | Excellent | Good. |
| B (alkaline) | Fair | Poor | Poor. |
| C (alkaline) | Fair | Poor | Poor. |
| D (acidic) | Excellent | Excellent | Good. |

In another test, an acidic (pH 4.0) latex dispersion of a butadiene-styrene copolymer analogous to sample A above was coated on bright steel panels, and the coatings were dried in air and baked under different conditions with results as shown in Table II.

Table II

| Baking Schedule | Hardness (Pencil) | Resistance to— | |
|---|---|---|---|
| | | Mineral Spirits | Water |
| 250° F. for 30 minutes | 4H | OK | Good. |
| 275° F. for 30 minutes | 5H | OK | Good. |
| 350° F. for 15 minutes | 5H | OK | Good. |

The hardness test was carried out by attempting to scratch the coating with the chisel-sharpened points of common lead pencils of various standard hardnesses. The value reported is that of the hardest pencil which the coating film will resist without scraping the film from the base metal. The resistance to mineral spirits was qualitatively determined by examination of the coating after immersion in mineral spirits at 25° C. for one hour. The mineral spirits employed was a medium boiling, predominately aliphatic hydrocarbon liquid mixture having a Kauri-Butanol number in the range of from 34 to 38. The resistance to water was qualitatively determined by examination of the coating after immersion in water at 25° C. for 48 hours.

The specimen identified in the Table II as having been baked at 275° F. for 30 minutes was further tested by being immersed for 24 hours in a 3 percent by weight aqueous solution of sodium hydroxide at room temperature. In another test, the coated panel was immersed for 24 hours in a 5 percent by weight aqueous solution of acetic acid at room temperature. Neither of these treatments caused any observable detrimental effects on the coating or on the base metal.

EXAMPLE 2

A pigmented dark green gloss enamel was prepared as follows.

A pigment dispersion was prepared by mixing 21.6 parts by weight of water and 43 parts by weight of a chromium oxide pigment with small amounts of dispersing agent and anti-foamer and grinding the mixture in a pebble mill for 16 hours. The pigment grind was then blended with a latex composition prepared by mixing 742 parts by weight of a latex, 8.8 parts by weight of a carbon black dispersion, 35.3 parts by weight of a wax emulsion, and 20 parts by weight of a thickener dispersion. The latex was an acidic (pH value 4.3) aqueous dispersion containing 46 percent by weight of a copolymer of 40 percent by weight 1,3-butadiene and 60 percent by weight styrene. The carbon black dispersion contained 20 percent by weight of colloidal carbon black dispersed in water. The wax emulsion contained 46 percent by weight of a microcrystalline paraffinic wax. The thickener was a dispersion in water of 5 percent by weight of a 50 centipoise viscosity methoxy cellulose. Acetic acid was added to the resulting paint composition to make the pH value 5.0.

A portion of the acidic latex paint was sprayed on clean steel panels. After air drying for 15 minutes, the coatings were baked in air at temperatures in the range from 300 to 320° F. for 30 minutes.

The coated metal surfaces were glossy, smooth, hard and mar resistant. The coatings were securely bonded to the steel and were resistant to mineral spirits and to water.

EXAMPLE 3

A dark grey gloss enamel was compounded as follows.

A pigment grind was prepared by grinding in a pebble mill for 16 hours a mixture of 25 parts by weight water, 66 parts by weight of titanium dioxide pigment and small amounts of dispersing agent and antifoamer. The pigment grind was blended with a latex composition prepared by mixing 722 parts by weight of an acidic latex, 15 parts by weight of an acidic latex, 15 parts by weight of a carbon black dispersion, 35.6 parts by weight of a microcrystalline wax emulsion, and 15 parts by weight of a methoxy cellulose dispersion, the ingredients of the latex composition being the same as those described for the latex composition of Example 2 except for the relative proportions thereof. The pH value of the resulting latex paint was adjusted to 5.0 by addition thereto of acid.

A portion of the latex paint was sprayed on clean steel panels. After drying in air for 15 minutes, the coatings were baked in air at temperatures in the range from 300 to 320° F. for 20 minutes to provide smooth, glossy, hard, and tightly adherent coatings that were resistant to water and to mineral spirits.

EXAMPLE 4

An iron oxide primer finish for metallic iron was prepared as follows.

A pigment dispersion was prepared by passing the following composition through a paint roll mill.

| | Parts by weight |
|---|---|
| Red iron oxide | 375 |
| Barytes | 750 |
| China clay | 375 |
| Pigment dispersant ("Tamol 731" 25 percent active, by weight) | 18 |
| Water | 350 |

The resulting pigment dispersion was then blended with 1100 parts by weight of an acidic latex containing 46 percent by weight of a copolymer of 40 percent by weight 1,3-butadiene and 60 percent by weight styrene. The pH value of the resulting water-base paint was 4.6.

The primer was coated on clean steel panels and the coating was dried in air for 15 minutes. The dry, coated panels were then heated in air at approximately 275° F. for 30 minutes.

The baked coatings were very tightly bonded to the base metal panel and had excellent resistance to water and to mineral spirits. The primer could be wet-sanded and was an excellent undercoat for oleoresinous enamel finishes.

We claim:

1. A method for providing iron with an adherent coating which comprises coating a surface of metallic iron with a thin layer of an aqueous colloidal dispersion comprising a polymer of an aliphatic conjugated diolefin, which aqueous dispersion is characterized by a degree of acidity corresponding to a pH value not greater than 5, and drying that layer.

2. A method according to claim 1 which comprises the further step of heating the dried layer in air at temperatures from 250° F. to 400° F. for from 15 to 30 minutes.

3. A method according to claim 1 wherein the aqueous colloidal dispersion is a latex paint.

4. A method according to claim 1 wherein the aliphatic conjugated diolefin is 1,3-butadiene.

5. A method according to claim 1 wherein the polymer is a copolymer comprising from 30 to 60 percent by weight of an aliphatic conjugated diolefin.

6. A method according to claim 1 wherein the polymer is a copolymer comprising 30 to 60 percent by weight of 1,3-butadiene.

7. A method according to claim 1 wherein the polymer is a copolymer of from 30 to 60 percent by weight of 1,3-butadiene and correspondingly from 70 to 40 percent by weight of styrene.

8. A method for providing iron with an adherent coating, which method comprises coating a surface of metallic iron with a thin layer of an aqueous latex paint, which paint comprises a colloidally dispersed solid pigment and a colloidally dispersed polymer of an aliphatic conjugated diolefin and which paint is characterized by a degree of acidity corresponding to a pH value of from 2 to 5, drying that layer, and heating the dried layer in air at temperatures in the range from 250° F. to 400° F. for from 15 to 30 minutes to effect a substantial curing of the aliphatic conjugated diolefin polymer.

9. A method according to claim 8 wherein the polymer is a copolymer of from 30 to 60 percent by weight of 1,3-butadiene and correspondingly from 70 to 40 percent by weight of styrene.

10. A method for providing iron with an adherent coating, which method comprises coating a surface of metallic iron with a thin layer of an aqueous latex paint, which paint comprises a colloidally dispersed solid pigment and a colloidally dispersed polymer, the total volume of the solid pigment and polymer being from 15 to 50 percent of the volume of the latex paint and the amount of the solid pigment being not more than 45 percent by volume of the total solids in the paint, which paint is characterized by a degree of acidity corresponding to a pH value of approximately 4, the polymer being a copolymer of approximately 40 percent by weight of 1,3-butadiene and approximately 60 percent by weight of styrene, drying that layer, and heating the dried layer in air at temperatures in the range from 250° F. to 400° F. for from 15 to 30 minutes to effect a substantial curing of the butadiene polymer.

11. An article having a metallic iron surface coated with an adherent coating provided by the method according to claim 1.

12. An article having a metallic iron surface coated with an adherent coating provided by the method according to claim 2.

13. An article having a metallic iron surface coated with an adherent coating provided by the method according to claim 8.

14. An article having a metallic iron surface coated with an adherent coating provided by the method according to claim 10.

References Cited in the file of this patent
UNITED STATES PATENTS

| | | |
|---|---|---|
| 2,141,126 | Doolittle | Dec. 20, 1938 |
| 2,498,712 | Ryden | Feb. 28, 1950 |
| 2,650,163 | Horsey et al. | Aug. 25, 1953 |
| 2,709,689 | Herzog et al. | May 31, 1955 |
| 2,768,908 | Cull | Oct. 30, 1956 |
| 2,783,166 | Deanin | Feb. 26, 1957 |